(12) United States Patent
Su et al.

(10) Patent No.: US 8,161,805 B2
(45) Date of Patent: Apr. 24, 2012

(54) METHOD AND APPARATUS FOR OBTAINING QUANTITATIVE MEASUREMENTS USING A PROBE BASED INSTRUMENT

(75) Inventors: Chanmin Su, Ventura, CA (US); Nghi Phan, Santa Barbara, CA (US); Craig Prater, Santa Barbara, CA (US)

(73) Assignee: Bruker Nano, Inc., Santa Barbara, CA (US)

( * ) Notice: Subject to any disclaimer, the term of this patent is extended or adjusted under 35 U.S.C. 154(b) by 410 days.

(21) Appl. No.: 12/398,011

(22) Filed: Mar. 4, 2009

(65) Prior Publication Data

US 2009/0222958 A1 Sep. 3, 2009

Related U.S. Application Data

(62) Division of application No. 11/106,366, filed on Apr. 14, 2005, now Pat. No. 7,596,990.

(60) Provisional application No. 60/562,116, filed on Apr. 14, 2004.

(51) Int. Cl.
*G01B 5/28* (2006.01)
*G01Q 90/00* (2010.01)

(52) U.S. Cl. ............... 73/105; 850/33; 850/62; 850/63

(58) Field of Classification Search .................. None
See application file for complete search history.

(56) References Cited

U.S. PATENT DOCUMENTS

| 5,193,383 | A | * | 3/1993 | Burnham et al. | 73/105 |
| 5,866,807 | A | * | 2/1999 | Elings et al. | 73/105 |
| 5,959,200 | A | * | 9/1999 | Chui et al. | 73/105 |
| 6,457,349 | B1 | * | 10/2002 | Miyahara et al. | 73/82 |
| 6,993,959 | B2 | * | 2/2006 | Shoelson | 73/105 |

* cited by examiner

*Primary Examiner* — Daniel Larkin
(74) *Attorney, Agent, or Firm* — Boyle Fredrickson, S.C.

(57) ABSTRACT

A method includes determining the point at which a tip of a probe based instrument contacts a sample and/or the area of that contact by dynamically oscillating a cantilever of the instrument in flexural and/or torsional modes. The method additionally includes using oscillation characteristics, such as amplitude, phase, and resonant frequency, to determine the status of the contact and to provide quantitative data. Static and quasi-static measurements, including contact stiffness and elastic modulus, can be obtained from the thus obtained data. Quasistatic measurements, such as creep and viscoelastic modulus, can be obtained by repeating the static measurements for a number of force profiles at different force application rates and correlating the resultant data using known theories.

14 Claims, 15 Drawing Sheets

PROR ART

METHOD AND APPARATUS FOR OBTAINING QUANTITATIVE MEASUREMENTS USING A PROBE BASED INSTRUMENT

CROSS REFERENCE TO RELATED APPLICATIONS

This application is a divisional of commonly assigned U.S. patent application Ser. No. 11/106,366; filed Apr. 14, 2005, now U.S. Pat. No. 7,596,990, which claims priority under 35 U.S.C. §119(e) to U.S. provisional Application Ser. No. 60/562,116, filed Apr. 14, 2004 and entitled "Method and Apparatus for Obtaining Quantitative Measurements Using a Probe Based Instrument", the contents of which are hereby incorporated by reference in their entirety.

BACKGROUND OF THE INVENTION

1. Field of the Invention

The present invention is directed to probe-based instruments and, more particularly, relates to a method and apparatus for facilitating high speed dynamic and quasi-static measurements using such an instrument. In a particularly preferred embodiment, the invention relates to the control of such an instrument to reduce or minimize lateral forces on the probe in order, e.g., to facilitate quantitative indentation measurements on the nanoscale. The invention additionally relates to the taking of indentation measurements using a probe based instrument.

2. Description of Related Art

Several probe-based instruments monitor the interaction between a cantilever-based probe and a sample to obtain information concerning one or more characteristics of the sample. For example, scanning probe microscopes (SPMs) typically characterize the surface of a sample down to atomic dimensions by monitoring the interaction between the sample and a tip on the cantilever probe. By providing relative scanning movement between the tip and the sample, surface characteristic data can be acquired over a particular region of the sample, and a corresponding map of the sample can be generated.

The atomic force microscope (AFM) is a very popular type of SPM. The probe of the typical AFM includes a very small cantilever which is fixed to a support at its base and which has a sharp probe tip attached to the opposite, free end. The probe tip is brought very near to or into contact with a surface of a sample to be examined, and the deflection of the cantilever in response to the probe tip's interaction with the sample is measured with an extremely sensitive deflection detector, often an optical lever system such as described in Hansma et al. U.S. Pat. No. RE 34,489, or some other deflection detector such as strain gauges, capacitance sensors, etc. The probe is scanned over a surface using a high-resolution three axis scanner acting on the sample support and/or the probe. The instrument is thus capable of creating relative motion between the probe and the sample while measuring the topography, elasticity, or some other surface property of the sample as described, e.g., in Hansma et al. U.S. Pat. No. RE 34,489; Elings et al. U.S. Pat. No. 5,226,801; and Elings et al. U.S. Pat. No. 5,412,980.

AFMs may be designed to operate in a variety of modes, including contact mode and oscillating mode. In contact mode operation, the microscope typically scans the tip across the surface of the sample while keeping the force of the tip on the surface of the sample generally constant. This effect is accomplished by moving either the sample or the probe assembly vertically to the surface of the sample in response to sensed deflection of the cantilever as the probe is scanned horizontally across the surface. In this way, the data associated with this vertical motion can be stored and then used to construct an image of the sample surface corresponding to the sample characteristic being measured, e.g., surface topography. Alternatively, some AFMs can at least selectively operate in an oscillation mode of operation such as TappingMode™ (TappingMode is a trademark of Veeco Instruments, Inc.) operation. In TappingMode™ operation the tip is oscillated at or near a resonant frequency of the cantilever of the probe. The amplitude or phase of this oscillation is kept constant during scanning using feedback signals, which are generated in response to tip-sample interaction. As in contact mode, these feedback signals are then collected, stored, and used as data to characterize the sample.

Regardless of their mode of operation, AFMs can obtain resolution down to the atomic level on a wide variety of insulating or conductive surfaces in air, liquid or vacuum by using piezoelectric scanners, optical lever deflection detectors, and very small cantilevers fabricated using photolithographic techniques. Because of their resolution and versatility, AFMs are important measurement devices in many diverse fields ranging from semiconductor manufacturing to biological research.

One potentially problematic characteristic of AFMs and other probe-based instruments lies in the inability to obtain some types of nanomechanical quantitative measurements at sufficiently high speeds and/or with sufficient accuracy to meet the ever increasing demands of industry and science.

For example, AFM's have traditionally been incapable of obtaining precise quantitative measurement of some mechanical properties. This inability is increasingly problematic because the demand for such measurements is rapidly increasing. For instance, polymers are being used with increasing frequency in the semiconductor industries as "low-k dielectrics" to fill the gaps or trenches in capacitors used in memory devices. The low-k dielectrics may have a width of 100 nanometers or less. It is often desirable to determine the mechanical properties of these materials.

As another example, nanophase materials such as "block copolymers" (formed from blends of two highly dissimilar polymers) are being used in a variety of applications. It is often desirable to measure the composition and structure of these materials on the nanometer scale. Both types of measurement require the acquisition of data obtained from an indentation measurement performed by monitoring the response of a probe as the probe indents the sample surface. The resultant data can be used to determine elasticity modulus, plastic deformation, and other mechanical characteristics. Prior AFM's can obtain qualitative indentation measurements using a so-called "compositional imaging" technique, but could not obtain quantified measurements.

Several hurdles prevent the transformation of traditional qualitative instruments into high speed and high bandwidth quantitative tools for these nanomechanical quantitative measurements. It has been discovered that one of the key barriers arises from lateral forces that are applied to the probe as result of cantilever bending. To apply a force to the sample for the purposes of, e.g., obtaining an indentation measurement, the fixed end of the cantilever is moved vertically through a distance $\Delta z$ with the tip in contact with the sample. The resultant cantilever bending generates a force $k \cdot \Delta z$, where k is the spring constant of the cantilever. This force is not, however, applied normal to the cantilever. A component of the force instead is imposed laterally or along the length of the cantilever. This component was historically deemed to be non-problematic because the lateral component of the applied force vector is typically assumed to be much smaller than the normal component. However, it has been discovered that the lateral force can in fact be an order of magnitude higher than the normal force.

The reasons for this somewhat counterintuitive characteristic of AFM operation can be appreciated from FIG. 1, which schematically shows an AFM probe P interacting with a sample S during an indenting operation. The probe P includes a cantilever C having a tip T. The cantilever C is fixed on or formed integrally with a base B. The probe P is typically inclined at an angle α of about 10° to 15° relative to the surface of the sample S in order to assure adequate clearance between the probe holder and the sample and in order to facilitate data acquisition by a probe detector assembly. As the probe-sample spacing in the z direction is decreased (by movement of the probe P toward the sample and/or by movement of the sample S toward the probe P in the Z direction) to increase the indentation force, the lateral distance available to the cantilever C in the plane L decreases. This decrease creates a compressive strain along the length of the cantilever C. Since the cantilever C has a much higher stiffness along its length in the plane L than perpendicular to its length in the plane N, the majority of the applied force is actually directed in the lateral direction in the plane L.

It has also been discovered that mounting the probe P horizontally to reduce the angle α to zero does not eliminate the lateral forces on the cantilever C because of the intrinsic asymmetry of the cantilever probe configuration. The imposition of the unintended lateral force on the cantilever C causes a host of problems, including lateral motion of the tip T during indenting, convolution of frictional effects with elastic properties, and non-axially symmetric application of the indenting force.

Some current AFM indentation tools attempt to reduce the lateral forces on a probe by moving the probe laterally away from the indentation point as the probe-sample spacing decreases. The control of this movement is open-loop based upon historical data. It assumes the absence of hysteresis and a constant cantilever angle. Both assumptions usually prove inaccurate in practice, resulting in less than optimal lateral force counteraction.

Axially symmetric indenters have been developed. However, these instruments have low mechanical bandwidth (on the order of 300 Hz) and relatively poor sensitivity because these are subject to high levels of noise. For instance, MTS and Hysitron produce nano-indentation devices in which an indenter tip such as a Berkovich tip is driven into a sample using a multi-plate capacitor transducer system. The device has drive and pickup plates mounted on a suspension system. It provides relative movement between the plates when the forces applied to the pickup plates drive the probe into contact with the sample. The change in space between the plates provides an accurate indication of the probes vertical movement. The input actuation forces and vertical position readout are therefore all-decoupled, resulting in a generally purely symmetrical indentation process. In practice, the sensor element is mounted on a scanning tunnel microscope, and a sample is mounted on the sensor. The force sensor then can be used for both measuring the applied force during micro indentation or micro hardness testing and for imaging before and after the testing to achieve an applied AFM-type image of the surface before and after the indentation process. Systems of this type are described, e.g., in U.S. Pat. Nos. 5,576,483 to Bonin and 6,026,677 to Bonin, both assigned to Hysitron Incorporated.

While the indenter described above provides axially symmetric indentation, it has a very low bandwidth because of the relatively large mass of the capacitive plates. The instrument also cannot obtain an accurate image of indentations, particularly in relatively elastic samples, because of sample rebound between the indentation and image acquisition passes and because of the large tip radius inherent in the indenter tip. It also has relatively poor force sensitivity, on the order of 15 nano-Newtons, as opposed to a few pico-Newtons for a true AFM having a much smaller tip.

Other obstacles have also heretofore prevented AFM-based quantitative indentation measurements.

For instance, prior AFM-based indenters, like other indenters, indented the sample and acquired indentation data in two separate steps. That is, the sample is first indented using a probe to create an indent. Then, after the probe is removed from the indent, a raster scan or similar scanning technique is used to image the indent. However, the acquired image does not accurately reflect the indent for at least two reasons. First, the tip cannot accurately reflect deformation geometry. Second, an elastic material will at least partially recover or "rebound" between the indentation and imaging passes, resulting in partial disappearance of the indentation. In the worst case scenario of a near perfectly elastic sample surface, the indentation will nearly completely disappear between the indentation and imaging passes.

For instance, the displacement of a material in response to a given load provides useful information regarding property characteristics, including elastic modulus $E_{sample}$ and the plastic deformation. Loads are typically imposed by indenting a sample surface with a probe and measuring properties of the resulting indentation. The sample is indented through an indentation cycle having a "loading phase" in which the tip is driven into and indents the sample surface and a subsequent "unloading phase" in which the tip is withdrawn from the sample surface.

The load-displacement relationship resulting from an indentation cycle is expressed in the form of Hook's law for indentation induced deformations. Hook's law, which expresses the relationship between force and deformation, is expressed as follows:

$$L = a(h_{max} - h_f)^m \quad (1)$$

where:

L is the load applied to the cantilever probe, $h_{max}$, or penetration depth, represents maximum tip penetration into the sample during the indentation cycle; and $h_f$, or plastic indentation depth, is the plastically deformed part of the penetration depth $h_{max}$ which does not recover after load withdrawal.

During a typical indentation cycle, the loading probe will indent the sample to $h_{max}$ at the end of the loading phase when the applied load is the highest. Then, during the unloading phase, the unloading probe will separate from the bottom of the indentation at a release point $P_r$ above the point $P_{max}$ located at the lower limit of $h_{max}$. The derivative of equation (1) is called contact stiffness, S. S at any given depth h during deformation can be expressed as:

$$S = \frac{dL}{dh} \quad (2)$$

The static contact stiffness for an entire indentation cycle can be expressed as:

$$S = \frac{\Delta L}{\Delta h} \quad (3)$$

If lateral forces on the tip are counterbalanced, $\Delta L$ can be easily determined simply by detecting the vertical load, $L_{max}$, at the end of the loading phase of the indentation cycle. $\Delta h$ can be determined by subtracting the maximum penetration point $P_{max}$ from the initial contact point, $P_{ic}$, where the probe first engages the sample surface. $P_{max}$ can be measured directly using conventional monitoring techniques. $P_{ic}$ measurements are more difficult, and are part of a preferred embodiment of the invention.

S is dependent upon material properties as follows:

$$S = \frac{2}{\sqrt{\pi}} E_r \sqrt{A_{con}} \quad (4)$$

where $E_r$ is the reduced modulus of the sample/tip interaction; and
$A_{con}$ is the contact area during deformation, which is a function of indentation depth h;

The relationship between the elastic modulus of the $E_{sample}$ and $E_r$ can be expressed as follows:

$$\frac{1}{E_r} = \frac{(1 - v_{sample}^2)}{E_{sample}} + \frac{(1 - v_{tip}^2)}{E_{tip}} \quad (5)$$

where:

$E_{tip}$ is the elastic modulus for the tip, which is known for a tip of a known material, and
$V_{sample}$ and $V_{tip}$ are the Poisson ratio for the sample and the tip, respectively.

Poisson ratios vary only minutely from material to material, so $V_{sample}$ can be assumed to be close to $V_{tip}$, which is a known constant C for a known tip material. Hence, equation 5 can, as a practical matter, be reduced to:

$$\frac{1}{E_r} = \frac{(1 - c^2)}{E_{sample}} + \frac{(1 - c^2)}{E_{tip}} \quad (6)$$

Referring again to Equation (4), $E_r$ can be determined from a measured contact area $A_{con}$ using the equation:

$$E_r = \frac{\sqrt{\pi}}{2\sqrt{A_{con}}} S \quad (7)$$

Hence combining equations (6) and (7), the sample elastic modulus $E_{sample}$ can be determined as follows:

$$E_{sample} = (1 - c^2) / \left( \left( 2\sqrt{A_{con}} / \sqrt{\pi} \right) - \frac{(1 - c^2)}{E_{tip}} \right) \quad (8)$$

Practically speaking, the greatest challenge for quantitative mechanical measurements is to measure the contact area, $A_{con}$, which is a function of the actual contact depth, $h_{cact}$, and the tip shape. The actual contact depth usually is not the same as the penetration depth, $h_{max}$, because a sample having any elasticity will deform away from the tip at the upper portion of the indentation, leaving a space, $h_s$, between the upper limit of the $h_{cact}$ and the initial contact point $P_{ic}$, as can be appreciated from FIG. 13A. The possible variations in this discrepancy can be appreciated from a comparison of FIG. 14A and FIG. 14B, which illustrate the indentation of the same tip T into the highly plastic sample $S_1$ and a highly elastic sample $S_2$, respectively. In a plastic sample, the material conforms closely to the shape of the tip T throughout the depth of the indent I, the contact area and indent area are essentially the same. In contrast, in a highly elastic sample, only a small portion of the tip above the apex A is embedded in the sample at the bottom of the indentation stroke. The remainder of the embedded portion of the tip T is surrounded by a free space extending radially from the tip T to the perimeter of the indent I, resulting in an indent area that is much larger than the area of the imbedded portion of the tip.

In addition, the lower limit of $h_{cact}$, being the point of separation of the apex of the tip from the bottom of indentation during the unloading phase of the indentation cycle (hereafter referred to as the "release point", $P_r$), is not the same as the deepest penetration point $P_{max}$. This is because a sample having any significant elasticity will rebound as the tip is being withdrawn from the sample, resulting in a $P_r$ that is above $P_{max}$ as seen in FIG. 13B. As a result, the actual contact depth $h_{cact}$ required for elastic modulus determination is reduced by the difference between $P_{max}$ and $P_r$.

A determination of $h_{cact}$ therefore requires a determination of the location of both the release point $P_r$, where the apex of unloading tip first separates from the bottom of the rebounding indent, and the upper separation point, $P_{sep}$, where no portion of the unloading tip contacts the detent.

The initial contact point, $P_{ic}$, is often determined simply by determining the location at which the force imposed on the loading cantilever markedly changes during the loading phase of the indentation cycle. Referring to the force displacement curves 15 and 18 of FIG. 15, that point is relatively accurately determinable for a relatively hard surface which has a marked reaction to initial contact, evidenced by a "snap to contact" as a result of adhesive forces arising when the probe comes into close proximity with the sample surface, followed by a sharp increase in force as the probe is driven against the sample surface. That resistance is evidenced by the steep slope of the curve 15 after the initial "snap to contact" at point 16 in FIG. 15. However, in the case of a relatively soft sample such as a gel, the sample surface provides very little initial resistance to tip motion after the tip contacts the surface. The tip may drive well into the sample surface before the threshold resistance allegedly indicative of contact point is reached, resulting in an inaccurate determination of initial contact point. This problem can be appreciated by the very shallow and ill-defined slope of the curve 18 in FIG. 15.

A need therefore exists for a more accurate detection of initial contact point $P_{ic}$, particularly in the case of indenting relatively soft samples.

Prior systems also have difficulty determining the release point, $P_r$, and the actual contact depth, $h_{cact}$ during indentation because material measurements are taken in a separate scanning operation sometime after the tip is removed from the indented sample. If the sample is relatively elastic or viscoelastic, creep, defined as changes in elastic deformation over time, will alter both the depth and area of the indent as the sample rebounds toward its original shape following initial tip removal.

In summary a quantitative mechanical property determination with cantilever probe based AFM the following aspects should be adequately addressed:

1. The load must be well defined. Since the cantilever sensor is primarily a flexural sensor, the lateral force along the cantilever axis is unknown and should be counteracted prior to determining load.

2. Contact points, including initial contact point, $P_{ic}$, the release point, $P_r$, and the separation point, $P_{sep}$, should be accurately measured.

3. With the knowledge of the tip shape, the contact area can be determined quantitatively.

Furthermore, the need has broadly arisen to provide a probe based instrument that is capable of obtaining high speed, high bandwidth quantitative measurement of mechanical properties through indentation and other interactions. It is believed that in order to meet these needs, the lateral component of AFM based indentation needs to be reduced by 2 to 3 orders of magnitude than is usually achievable using current techniques.

Partially in order to meet the above-identified need, and partially in order to achieve other benefits like more controlled tip-sample interaction, the need has also arisen to effectively and reliably counteract the lateral forces imposed on a probe as a result of probe-sample interaction.

SUMMARY OF THE INVENTION

In accordance with one aspect of the invention, a method includes determining the point at which a tip of a probe based instrument contacts a sample and/or the area of that contact by dynamically oscillating a cantilever of the instrument in flexural and/or torsional modes. The method additionally includes using oscillation characteristics, such as amplitude, phase, and resonant frequency, to determine the status of the contact and to provide quantitative data. Static and quasi-static measurements, including contact stiffness and elastic modulus, can be obtained from the thus obtained data. Quasistatic measurements, such as creep and viscoelastic modulus, can be obtained by repeating the static measurements for a number of force profiles at different force application rates and correlating the resultant data using known theories (see A. S. Nowick and B. S. Berry, Anelastic Relaxation in Crystalline Solids, Academy Press, 1972).

Initial contact point $P_c$ can be unambiguously determined by monitoring operation of an oscillating probe because, at the onset of even an extremely small contact force occurring at the beginning of the probe's loading phase of an indentation cycle, measurable change in the resonant properties will be evident, providing a precise indication of initial contact point. Preferably, the probe is driven in so-called "torsional resonance" mode, whereby the cantilever is excited to resonate in torsion and the AFM detects changes in amplitude, phase, or frequency in response to surface interactions. (See U.S. Ser. Nos. 10/189,108 and 10/937,597, each of which is expressly incorporated by reference herein) The motion of the apex of the probe's tip in this mode is typically less than a nanometer, but the torsional resonance has a particularly strong dependence on the frequency, amplitude, and phase changes with tip sample separation.

The actual contact depth $h_{cact}$ can similarly be measured by monitoring interaction between an unloading cantilever and the sample while imparting oscillating relative movement between the probe and the sample. For instance, when torsional resonance is superimposed on an unloading cantilever, a torsional resonant amplitude could develop as soon as the tip has an angstrom-range length of space to oscillate within the indentation, occurring at the release point, $P_r$. As the tip continues to unload, the average space between the tip and the perimeter of the indentation increases with a resultant change in torsional amplitude or phase. The separation point, $P_{sep}$, can be detected when the monitored tip oscillation characteristic approaches oscillation in free air, indicating that no portion of the oscillating probe is engaging the indentation perimeter. The actual contact depth $h_{cact}$ can be determined by subtracting the detected separation point, $P_{sep}$, from the detected release point, $P_r$. Penetration depth $h_{max}$ can be determined by subtracting the determined initial contact point $P_{ic}$ from a directly detected probe position at the maximum penetration depth $h_{max}$. Contact area $A_{con}$ can also be determined from the data acquired during the unloading phase of the indentation cycle, provided that the tip is "characterized" i.e., provided that the size and shape of the tip are known so that the surface area of the tip is known. Tip characterization may be achieved, e.g., by direct measurement, and/or by using a reconstruction algorithm that employs a characterizer with a precisely known shape.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE PREFERRED EMBODIMENTS

1. Lateral Force Counteraction

One AFM described herein uses controlled actuation of an "active cantilever" to reduce or eliminate lateral forces on a probe of an AFM or other probe-based instrument when taking mechanical measurements, hence permitting the formation of axially symmetric indents and the accurate determination of applied vertical load. Because the loads are most problematic when taking indentation measurements, an embodiment will now be described in conjunction with an AFM configured to function as an indentation measuring tool. However, the lateral force reduction techniques discussed herein are usable during other measurements and on other instruments as well.

In the presently preferred embodiment, the indentation force is applied through a combination of a conventional z-actuator and an "active cantilever." The active cantilever could be any number of cantilevers that can be deformed in a controlled manner. It may, for example, be one that deforms under induced thermal stress, one that deforms under electromagnetic forces, one that deforms under ultrasonic pressure, and/or one that deforms under photon pressure. It preferably is piezoelectric composite cantilever, more preferably one that contains a layer of a ZnO piezoelectric film, for instance, between two metal electrodes deposited on a silicon cantilever, thus forming a "bimorph" device. By applying a voltage to the actuator's electrodes, the actuator bends towards or away from the sample surface. Active cantilevers of this type were originally developed for AFMs at Stanford University. Similarly, active cantilevers and control systems are described, for instance, in U.S. Pat. No. 5,317,533 to Quate et al. and U.S. Pat. Nos. 6,672,144 and 6,189,374 to Adderton et al., the disclosures of each of which are hereby incorporated by reference in their entirety.

Figure 1:
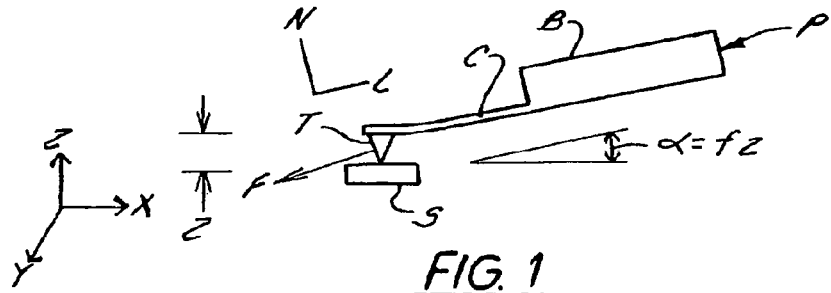
FIG. 1 schematically illustrates operation of a conventional passive probe of an AFM during a sample indentation process, appropriately labeled PRIOR ART.
Figure 2:
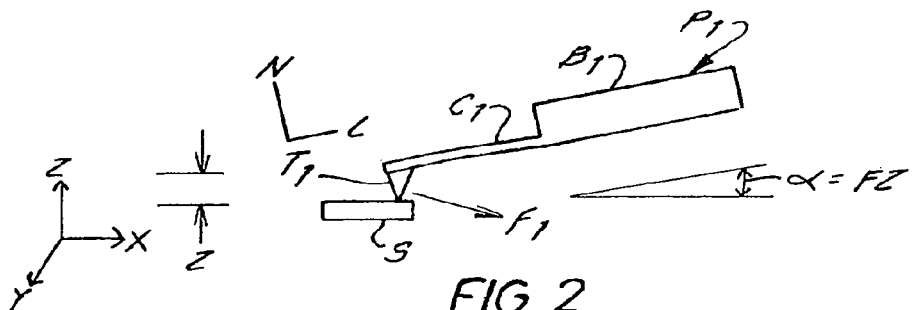
FIG. 2 schematically illustrates operation of a conventional active probe of an AFM during a sample indentation process; appropriately labeled PRIOR ART.
Figure 3:
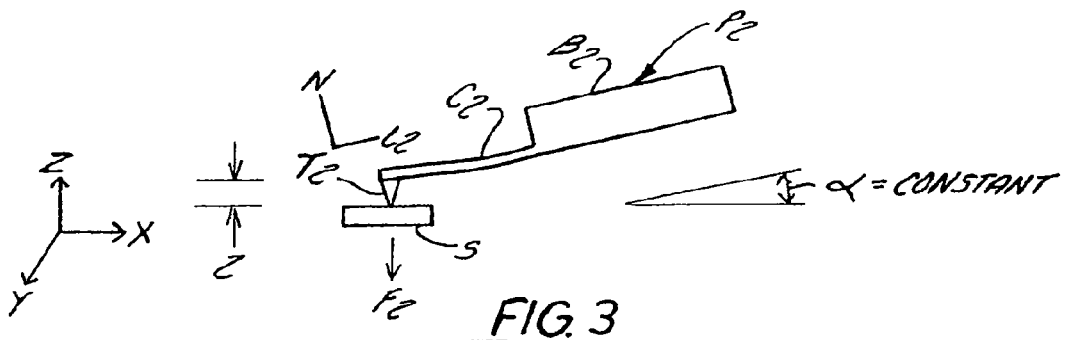
FIG. 3 schematically illustrates a prior art technique for obtaining indentation measurements using an AFM, appropriately labeled PRIOR ART.

It has been discovered that an active cantilever on a z position actuator can be controlled to balance the lateral loads imposed on the probe during an indenting operation. Referring again to FIG. 1, a conventional passive cantilever C applies a force F on the sample S having a lateral component that extends away from the laterally fixed probe base B. Conversely, as can be appreciated from FIG. 2, a probe P1 having a self-actuated bimorph cantilever C1 applies a force F1 having a lateral component that extends toward the laterally fixed probe base B. Because the lateral forces due to passive cantilever motion and active cantilever voltage loading are of the opposite signs, the two force application methods can be used to balance the lateral loads, provided that they are used simultaneously and properly scaled. This effect is demonstrated schematically in FIG. 3, in which the tip T2 of an active cantilever C2 of a probe P2 indents a sample S. As the probe-sample spacing z decreases, the active cantilever C2 can be actuated to cancel the lateral component of the force imposed by passive movement, resulting in the imposition of a purely normal force F2 on the cantilever C2 and a purely vertical force on the sample (provided that the tip T2 is mounted at an angle that compensates for the incline of then cantilever C2).

Figure 4A:
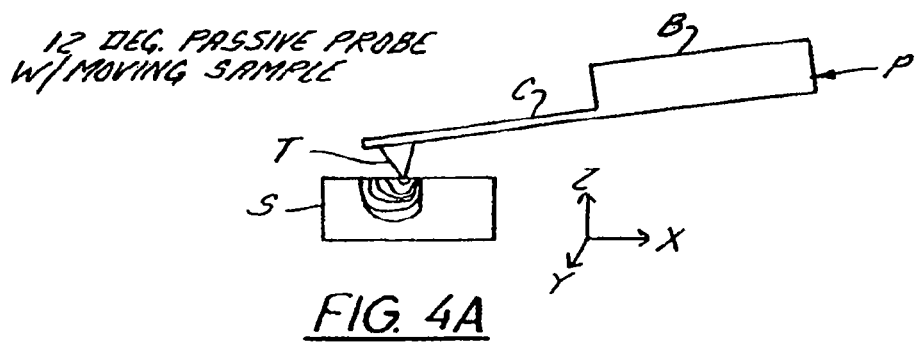
FIGS. 4A-4C are finite element analysis diagrams simulating operation of various prior art probes during sample indentation processes, appropriately labeled PRIOR ART.
Figure 4B:
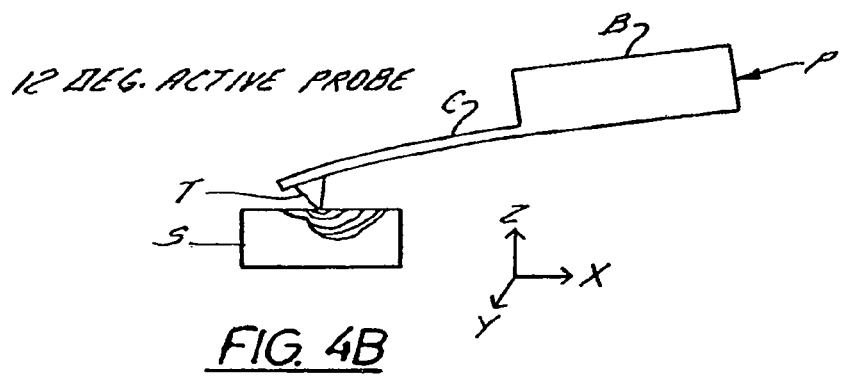
Figure 4C:
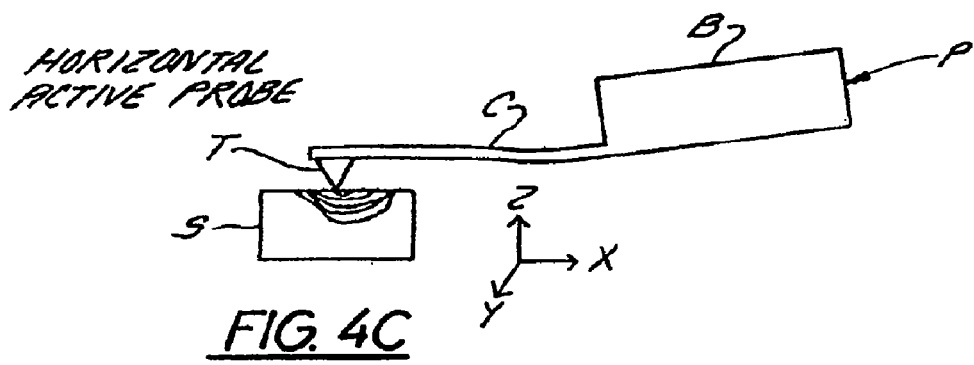
Figures 5A, 5B:
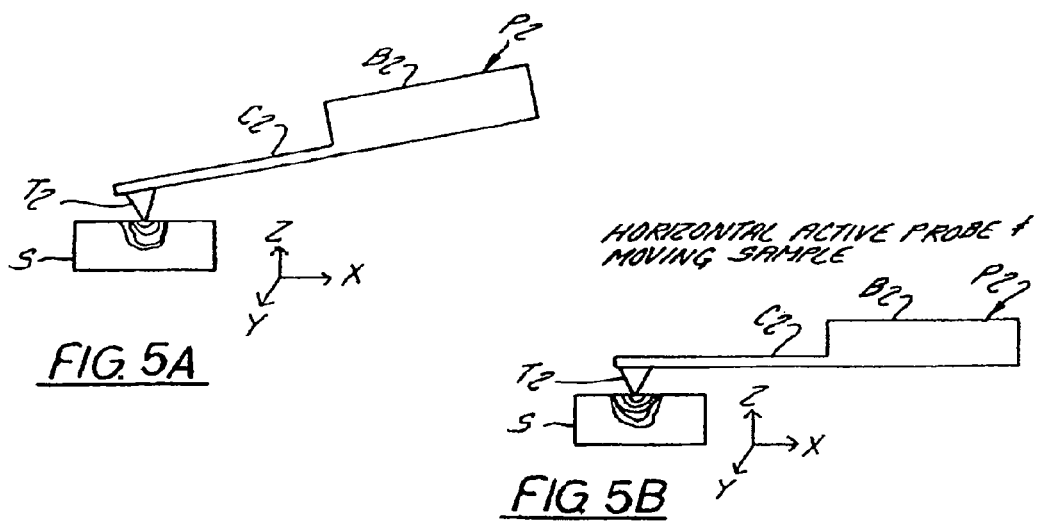
FIGS. 5a-5b are finite element analysis diagrams simulating operation of inventive probes during a sample indentation process.

Finite element analysis simulations demonstrate the possibility of generating purely vertical forces through lateral force cancellation. FIGS. 4A-5B illustrate force plots during indentation using a cantilever that is moved 100 nm into contact with a sample, the cantilever being 100 µm long by 8 µm thick. FIGS. 4A-4C plot the data for an inclined passive probe configured as discussed above in FIG. 1, an inclined active probe configured as discussed above in conjunction with FIG. 2, and a horizontal passive probe, respectively. All three simulations confirm that substantial lateral forces are generated during the indentation process—forces that are about twice the vertical forces in the case of the commonly employed inclined passive probe. A comparison of FIG. 4A to FIG. 4B also confirms that the lateral force components are in opposite directions for active and passive probes. Conversely, FIG. 5A confirms that coordinating control of an active cantilever and a z position actuator can balance the lateral forces on an inclined cantilever, resulting in the imposition of purely vertical forces on a sample. FIG. 5B similarly confirms that coordinating control of an active cantilever and a z position actuator can balance the lateral forces on a horizontal cantilever resulting in the imposition of purely vertical forces on a sample. The data illustrated graphically in FIGS. 4a-5b is confirmed numerically in Table 1:

TABLE 1

Forces Generated During Indentation

| Case | Vertical Force (nN) | Lateral Force (nN) | Total Force (nN) |
|---|---|---|---|
| 1 (FIG. 4a) | 825 | −1200.0 | 1456 |
| 2 (FIG. 4b) | 769 | 570 | 957 |
| 3 (FIG. 4c) | 426 | 206 | 474 |
| 4 (FIG. 5a) | 774 | 0 | 774 |
| 5 (FIG. 5b) | 706 | 0 | 706 |

The lateral forces could be canceled through open loop control of the active cantilever based on known cantilever properties. It is currently preferred, however, to use closed loop control to counteract the unwanted lateral forces. The currently preferred embodiment applies a voltage to at least one of (1) the piezoelectric bimorph of the active cantilever and (2) a separate z position actuator and adjusts the z-piezo voltage according to the variation of cantilever deflection to maintain the angle α of the free end of the cantilever C2 (FIG. 3) constant. The voltage applied to the piezoelectric bimorph 36 of the active cantilever therefore represents the applied force, and the displacement of the z-actuator represents the apparent penetration depth at any given time. (It is still necessary to adjust the apparent penetration depth by the "frame compliance," to obtain the true penetration depth $h_{max}$. This correction is a commonly used technique in indentation experiments.) Two AFMs configured to achieve this effect and a method of achieving it will now be described.

Figure 6A:
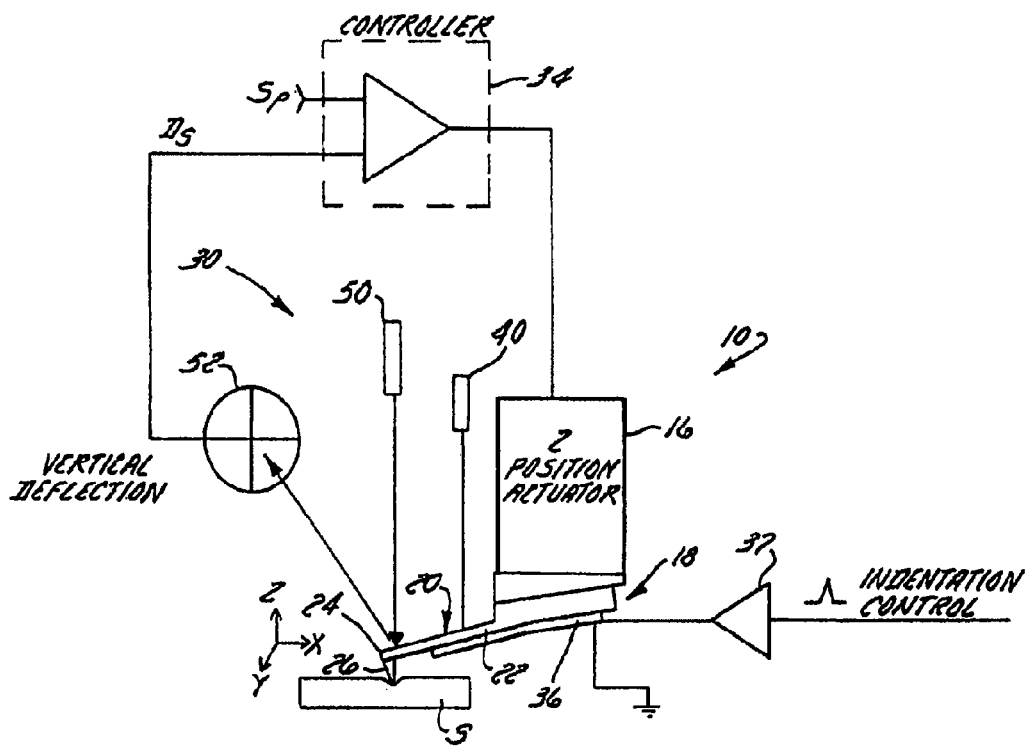
FIG. 6A schematically illustrates an AFM constructed in accordance with a first preferred embodiment of the present invention.

Referring now to FIG. 6A, an AFM 10 constructed in accordance with a first embodiment of the present invention is shown that has a probe assembly 18 configured to indent a sample S mounted on a support (not shown) which may be either fixed our movable. The probe assembly 18 of this embodiment is mounted on the bottom of a z position actuator 16 so as to be movable in a z direction which is perpendicular to a xy plane of the sample support. The z direction is typically vertical. Probe assembly 18 includes a self-actuated cantilever 20 having a tip 26 that interacts with a sample S during indentation. Cantilever 20 includes a fixed end 22, preferably mounted to an AFM mount (not shown) and a free, distal end 24 that receives tip 26. Cantilever 20 also bears a piezoelectric bimorph element 36 that can be energized to bend the cantilever 20 and, hence, raise and lower the tip 26. In operation, the interaction between tip 26 and sample surface (not shown) deflects the cantilever 20. To measure this deflection, AFM 10 includes a deflection detector 30 that may preferably be an optical detection system for measuring the cantilever deflection by any suitable method. Suitable methods include:

- an optical beam bounce technique (see, e.g., Meyer and Amer, "Novel Optical Approach to Atomic Force Microscopy," Appl. Phys. Lett. 53, 1045 (1988); Alexander, Hellemans, Marti, Schneir, Elings, Hansma, Longmire, and Gurley, "An Atomic-Resolution Atomic-Force Microscope Implemented Using an Optical Lever," Appl. Phys. Lett. 65 164 (1989)); or
- an interdigital diffraction grating technique (Manalis, Minne, Atalar, and Quate, "Interdigital Cantilevers for Atomic Force Microscopy," Appl. Phys. Lett., 69 (25) 3944-6 (1996); Yoralioglu, Atalar, Manalis, and Quate, "Analysis and design of an interdigital cantilever as a displacement sensor," 83(12) 7405 (June 1998)); or
- any other known optical detection method.

As is typical, the optical-based deflection detector 30 includes a laser 50 and a photodetector 52 that interact according to one of the above techniques. The resultant data produce information reflecting vertical and lateral deflection of the cantilever. That information can then be demodulated, either in external analogue or digital circuitry located external to the controller 34 (detailed below), or circuitry within the controller, to obtain information regarding the lateral and vertical positions of the probe, as well as phase information, if the probe 18 is operating in an oscillating mode such as TappingMode operation. When used in conjunction with very small microfabricated cantilevers and piezoelectric positioners as lateral and vertical scanners, AFMs of the type contemplated by the present invention can have resolution down to the molecular level, and can operate with controllable forces small enough to image biological substances.

With further reference to FIG. 6A, AFM 10 operates to precisely indent the sample S while maintaining the angle of the free end 24 of the cantilever 20 constant. In particular, instrument 10 includes a controller 34 that subtracts the setpoint SP from the cantilever deflection signal Ds, thereby generating an error signal that is at least indirectly indicative of a change in cantilever free end angle. Controller 34 is preferably a PI or PID controller. Controller 34 can be implemented in either analog or digital, and may apply either a linear gain or a gain characterized by a more complex computation. In particular, controller 34 can apply a gain to the error signal that is defined by one or more of a proportional, an integral or a differential gain.

Controller 34, in response to the error signal, generates a control signal using feedback and transmits the control signal to the piezoelectric z-actuator 16 in order to maintain the angle α of the free end 24 end of the cantilever 20 constant. However, z-piezo actuators are typically nonlinear and have substantial hysteresis. In order to make a precise measurement of vertical position, as is required for quantitative indentation, an independent z-sensor 40 is preferably employed to monitor operation of the z position actuator 16 under feedback. In the preferred embodiment, the sensor 40 is one recently developed by Veeco Instruments that provides an RMS noise floor of <0.05 nm in a 1 kHz bandwidth with a maximum range of 10 μm.

The controller 34 or a separate dedicated controller (not shown) also uses a feedback controller 37 to energize the bimorph element 36 under from the detector 52 to move the probe 18 in the z direction to indent the sample. Indentation is controlled under feedback from the deflection detector 34. Because, the lateral forces imposed on the cantilever 20 remain counteracted during indentation due to the simultaneous control of the z-actuator 16 as discussed above, the force on the sample therefore is a simple function of the indentation feedback voltage applied to the piezoelectric bimorph 36 of the active cantilever 22. If the frame compliance is neglected, the applied force is $F=k \cdot S \cdot V$, where F is the applied force, k is the cantilever spring constant, S is the piezobimorph sensitivity, and V is the applied voltage.

The controller 34 can determine the initial contact point $P_{ic}$, the release point $P_r$, the separation point $P_{sep}$, the actual contact depth $h_{cact}$, and contact area $A_{con}$ from the resultant information as described in greater detail below. Those parameters, in turn, can be used to determine sample properties of interest such as contact stiffness and, plastic deformation, and elastic modulus in a manner which is, per se, well known. These and other properties can then be manipulated further and/or displayed in a display device (not shown) such as a monitor.

It should be noted that, instead of using the bimorph element 36 for indentation control and the z position actuator 16 for lateral force counter feedback control, the roles of these two actuators could be reversed. In that case, the z position actuator 16 will be controlled to maintain the cantilever in a commanded position under feedback, and the bimorph element 36 will be controlled to counteract lateral forces in the cantilever. In addition, it should be understood that the z position actuator 16 could be used to move the sample S rather than the probe 18.

Figure 6B:
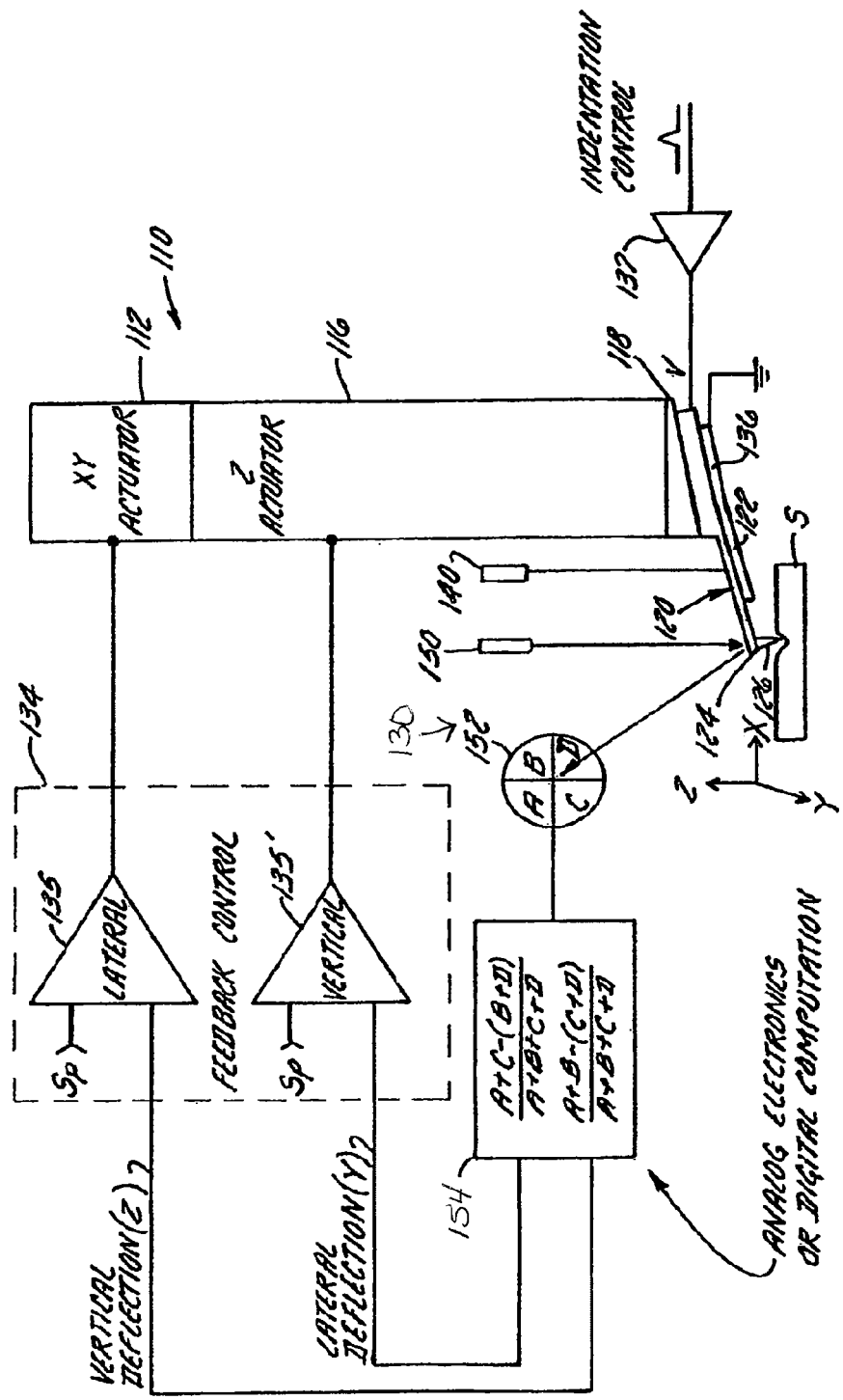
FIG. 6B schematically illustrates an AFM constructed in accordance with a second preferred embodiment of the present invention.

A more sophisticated AFM configured to counteract lateral forces on the probe during indentation is illustrated in FIG. 6B. The AFM 110 of this embodiment is similar to the AFM of the embodiment of FIG. 6A, and components thereof having corresponding components to those of FIG. 6A are therefore designated by the same reference numeral, incremented by 100. The AFM 110 therefore includes a z position actuator 116 and a piezoelectric bimorph element 136 mounted on a cantilever 120. The AFM 110 also includes a deflection detector 130 that preferably includes a laser 150 and a photo detector 152. It also includes a controller 134 and a z position sensor 140.

The AFM 110 of this embodiment differs from the AFM of the first embodiment in that it includes an additional XY actuator 112 which can be energized to permit counteraction of forces in the XY plane in order to prevent any movement of the tip in the Y direction or into and out of the page in the drawings. That is, digital or analog circuitry 154 can rely on signals from the detector 152 to determine lateral deflection in the Y direction, and those signals can be compared to a set point of a first feedback controller 135 of the controller 134 to move the XY actuator 112 to prevent movement of the tip in the Y direction during indentation, preferably by keeping a rotational angle of the cantilever free end constant. The same XY actuator 112 can be controlled under feedback to position the probe 118 over the sample S at a desired location for indentation and image acquisition. As with the previous embodiment, a feedback controller 135' within the controller 134 also transmits a control signal to the z actuator 116 under feedback from the detector 152 to maintain the angle of the end of cantilever 120 constant, while an additional controller 137 is activated under feedback to indent the sample S under feedback. Also as in the previous embodiment, it should be understood that one or both of the actuators 112 and 116 could be used to move the sample S rather than the probe 118.

Figure 7A:
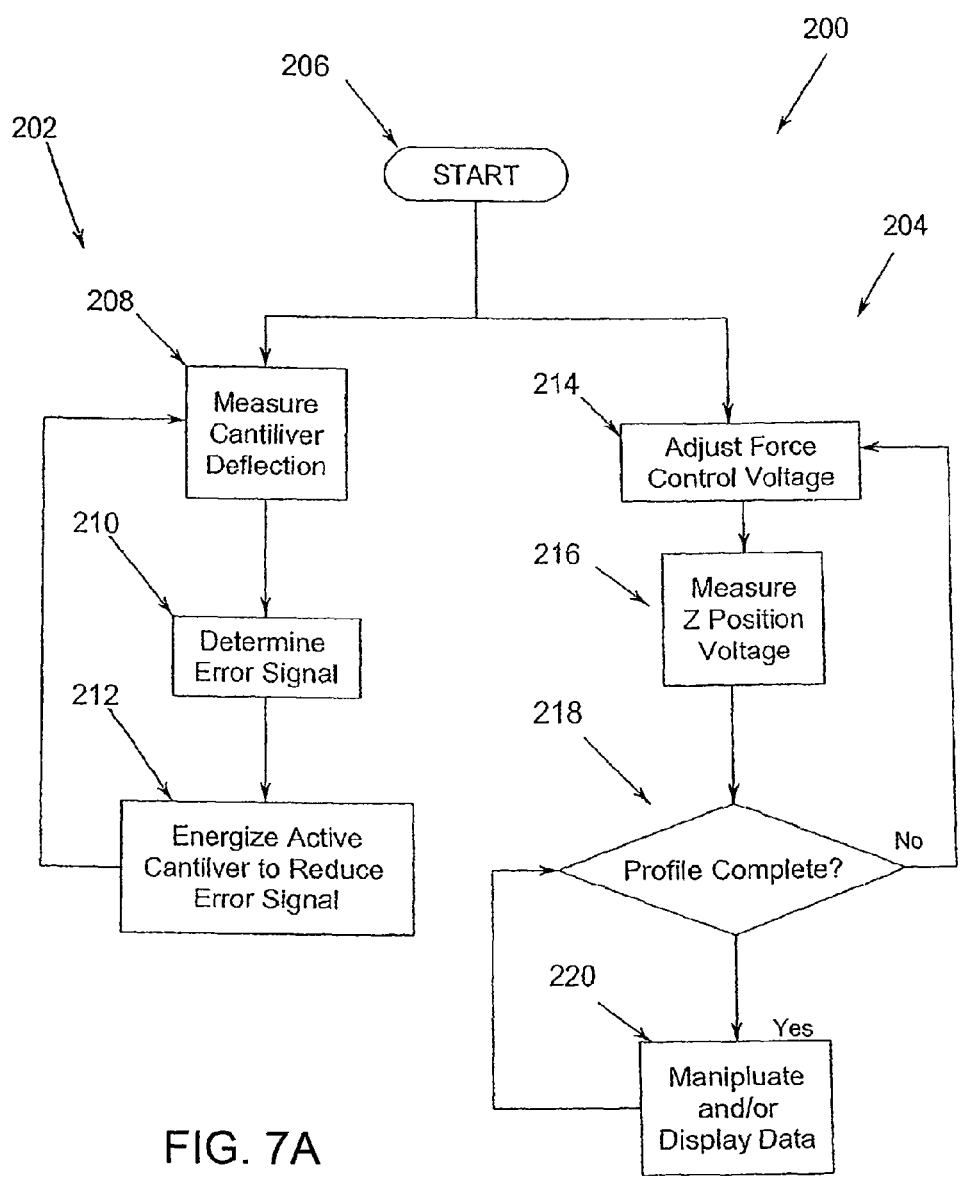
FIG. 7A is a flowchart of a process usable to control the AFM of FIG. 6A or 6B to obtain indentation measurements while counteracting lateral loads on the AFM's probe.

Referring to FIG. 7A, a possible process 200 for controlling the AFM 10 of FIG. 6A or the AFM 110 of FIG. 6B to obtain indentation measurements such as force curves and/or elasticity measurements while counteracting lateral forces includes two loops: one Loop 202 that maintains the cantilever deflection constant, and another Loop 204 that adjusts active lever voltage and measures z-sensor voltage to obtain indentation measurements. The Loops 202 and 204 can run synchronously and integrated or entirely asynchronously.

During the indentation process, Loop 202 proceeds from START in Block 206 to Block 208 to measure the position of a portion of the probe assembly, preferably the deflection of the cantilever's free end. Loop 202 then proceeds to Block 210, where the cantilever deflection is compared with a desired setpoint, and an error signal is generated that preferably is proportional to the difference between the detected deflection and the setpoint deflection. Again, this deflection is indicative of cantilever free end angle, but need not be a direct measurement of the angle. Loop 202 then proceeds to Block 212, where the controller causes a voltage to be delivered to the XY actuator and/or the z actuator to minimize or null the error signal, hence maintaining the cantilever deflection constant despite changes in probe-sample spacing and tip depth penetration during the indenting process. The lateral forces on the cantilever 20 therefore are counteracted. Loop 202 then returns to Block 208, where the operations of Blocks 210 and 212 are repeated on a continuous basis.

Loop 204 also proceeds from START 206 and then proceeds to Block 214, where voltage is applied to the cantilever's piezoelectric element to move the probe toward the sample and generate a force on the sample to ultimately generate a commanded force profile F(t). Due to the counteraction of lateral forces on the probe using the Loop 202, the force imposed on the sample is a simple function of the known voltage applied to the piezoelectric bimorph element. The Loop 204 then proceeds to Block 216, where the z position of the probe assembly is determined using the z-position sensor, hence providing the z position information required to obtain force vs. position data for that point on the profile. The Loop 204 then checks in Block 218 to determine whether the profiling process is complete, and, if not, cycles through Blocks 214, 216, and 218 until the profile is complete. The resultant data can be used as generally denoted by Block 220, e.g., to determine any of a number of sample characteristics, some of which are discussed below. This information can be displayed directly and/or combined with other properties of the sample to determine other sample properties. The probe assembly is then moved away from the sample and, if desired, repositioned over another point on the sample surface, where the process 200 is repeated.

Figure 7B:
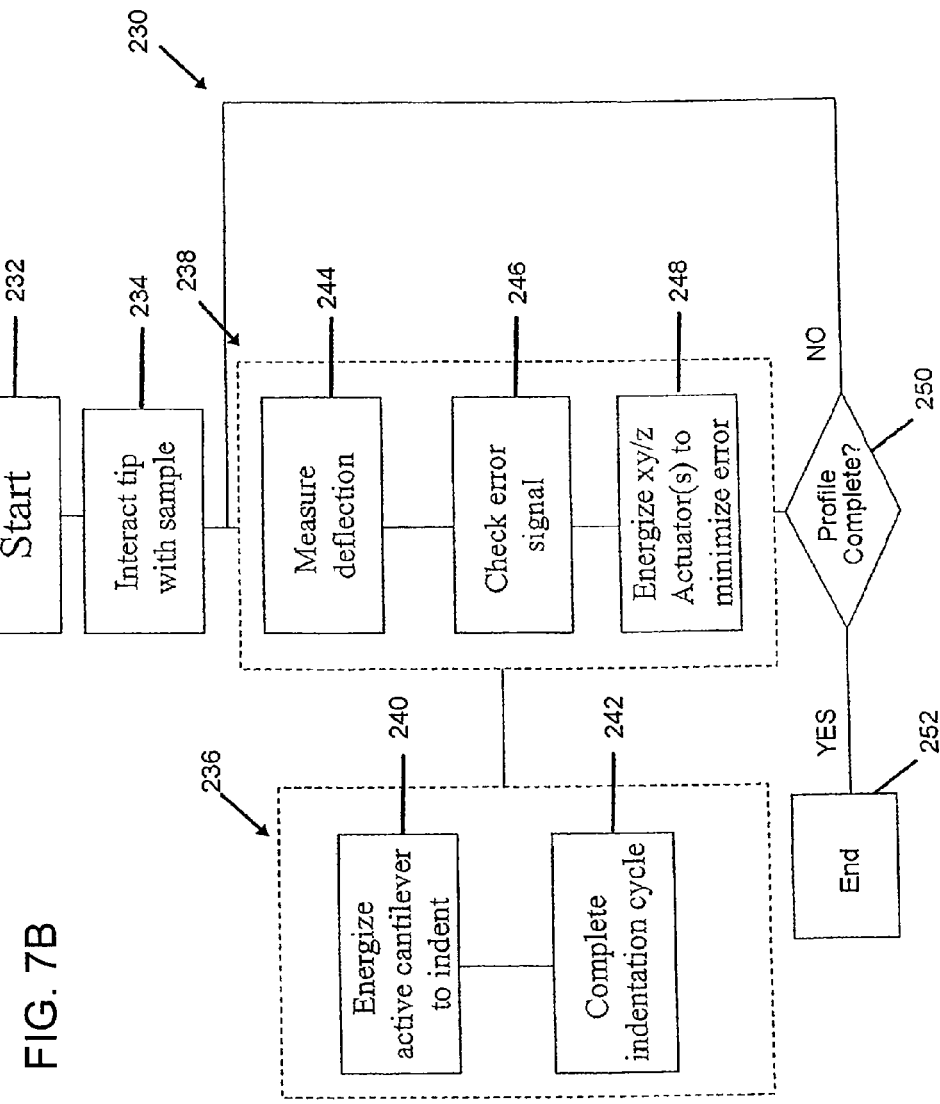
FIG. 7B is a flowchart of an alternative process usable to control the AFM of FIG. 6A or 6B to obtain indentation measurements while counteracting lateral loads on the AFM's probe.

A more generalized alternative process 230 for controlling either the AFM 10 of FIG. 6A or the AFM 110 of FIG. 6B is illustrated in FIG. 7B. As a practical matter, the process 230 differs from the process 200 discussed above in connection with FIG. 7A only in that the active cantilever is used for indentation and at least the z position actuator, and possibly the xy actuator (if present), are controlled to maintain the cantilever free end deflection angle constant. Hence, the process 230 first proceeds from Start in Block 232 to cause the probe to interact with the sample in Block 234. An indentation loop 236 is then implemented in which the active cantilever is energized to indent the sample surface in Block 240 to perform an indentation cycle as generally referenced in Block 242 using the technique discussed above. Simultaneously, a lateral force counteraction loop 238 is implemented via which cantilever free end deflection is measured in Block 244, an error signal is generated in Block 246, and the appropriate z position and/or xy position actuator(s) are controlled under feedback in Block 248 to maintain the cantilever deflection angle constant despite changes in probe/sample spacing and probe penetration depth.

As with the process 200, after the indentation cycle is complete, the processes of loops 236 and 238 can be repeated as many times as is needed to generate a force profile (see inquiry Block 250) useful for quasistatic measurements such as creep and viscoelastic modulus, whereupon the process 230 proceeds to End in Block 252.

2. Quantified Material Property Measurements

As discussed above, dynamic and quasistatic measurements can be combined to unambiguously determine the initial contact point $P_{ic}$, actual contact depth $h_{cact}$, and other parameters of the indentation. These measurements are taken during the "loading phase" of the indentation cycle in which the tip is driven into and indents the sample surface and the subsequent "unloading phase" in which the tip is withdrawn from the sample surface. The preferred technique involves monitoring probe response while imparting oscillating movement between the tip and the sample during the loading phase of the indentation cycle to determine the initial contact point $P_{ic}$ and during the unloading phase to determine actual contact depth $h_{cact}$.

Particularly during the loading phase, the relative movement could be a relative vertical movement caused, e.g., by exciting the probe to oscillate about the z-axis in flexural resonance. The initial contact point $P_{ic}$ is then detected by detecting a change in probe operation occurring as a result of tip-sample interaction occurring at the contact point. A possible operational mode is TappingMode, in which the probe is driven to oscillate at or near its resonance flexural frequency while the probe/sample spacing is decreased under feedback and a change in probe oscillation amplitude and/or frequency indicative of sample contact is detected.

It is currently preferred, however, that relative lateral oscillating movement be used as a source of both contact point detection and contact depth detection. Relative lateral movement could be made by shaking the sample and/or the probe as a whole along one or both axes of the XY plane in a manner that is, per se, well known. The preferred technique, however, utilizes torsional resonance or TR-Mode™ mode, which was recently commercialized by Veeco Instruments, Inc. In TR-Mode, a cantilever is excited to resonate at a torsional resonance, and a change in amplitude, phase or frequency in response to surface interactions is detected. (Torsional resonance imaging is discussed, for example, in U.S. patent application Ser. Nos. 10/189,108 and 10/937,597 filed Jul. 2, 2002 and Sep. 9, 2004, respectively, the subject matter of which is hereby incorporated by resonance in its entirety). The motion of the apex A of the tip T in TR mode is typically less than 1 nm, but the torsional resonance has a particularly strong dependence on the frequency, amplitude, and phase changes with tip-sample separation, permitting extremely precise detection of initial tip/sample interaction during the loading phase and initial separation during the unloading phase. The Q of TR mode is also very high, typically 1,000 to 2,000. As a result, the tip-sample interaction force, which is inversely proportional Q, does not deter the unloading deformation process in the vertical z direction. Both initial contact point determination and actual contact depth determination will now be described in greater detail.

Figure 8A:
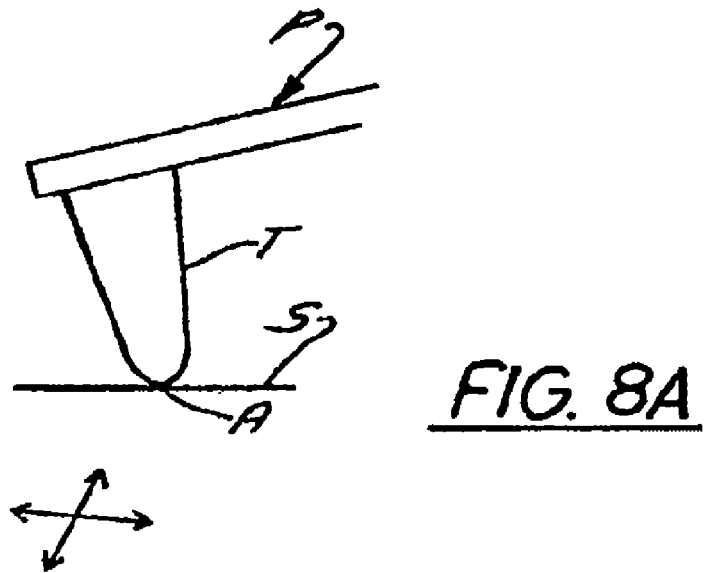
FIG. 8A schematically illustrates the contacting of a sample surface with a probe tip during relative oscillation of the probe and/or the sample in the X-Y plane.
Figure 8B:
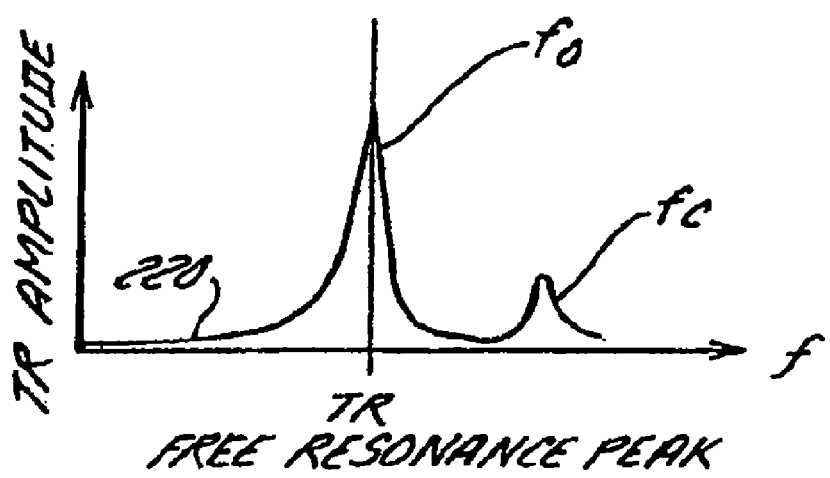
FIG. 8B is a graph illustrating a phase shift occurring upon the initial contact illustrated in FIG. 8A.

As seen in FIGS. 8A and 8B, a tip T resonating in free space has a free space resonance peak or simply "free air peak" $f_0$ at a particular frequency. As soon as the apex A of the tip T contacts the sample surface S, the mechanical boundary of the oscillation changes, resulting in the generation of a contact resonant frequency peak or simply "contact peak" $f_c$ at a different frequency than the free air peak $f_0$. The initial contact point $P_{ic}$ can be unambiguously determined by noting the onset of the contact peak $f_c$. As is to be expected, the amplitudes of the two peaks $f_0$ and $f_c$ are inversely are related so that $f_c$ is zero and $f_0$ is maximized when the cantilever oscillates in free air and $f_c$ is maximized and $f_0$ is minimized when the tip T is fully indented into the sample surface S at the end of the loading phase.

Penetration depth $P_{max}$, can be determined by monitoring the position of the probe at the juncture between the loading and unloading phase, taking frame compliance into account in a known manner. The maximum applied force can also be measured in a conventional manner at this time, hence permitting determinations of $\Delta P$ and $\Delta h$ for contact stiffness determination.

Determining onset of the contact peak $f_c$ during tip withdrawal provides an indication of the release point, $P_r$, and, accordingly, a bottom limit of the actual contact depth, $h_{act}$, and determining the duration of the contact peak $f_c$ provides an indication of contact area.

Figure 9A:
FIGS. 9A-9D collectively schematically illustrate a technique for obtaining indentation measurements on a real time basis, with FIGS. 10A-10D illustrating the resonances experienced by the probe at each stage of the measurement illustrated in FIGS. 9A-9D, respectively.
Figure 10A:
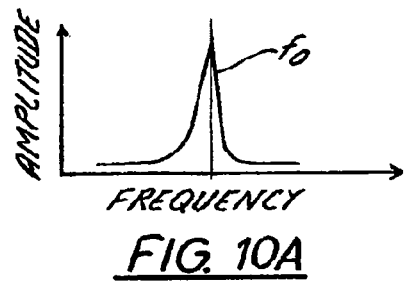
Figure 9B:
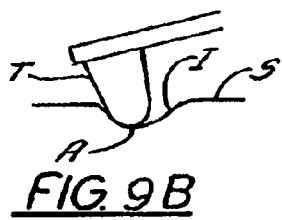
Figure 10B:
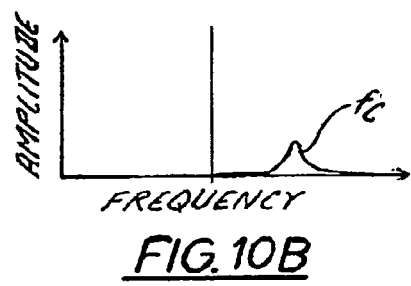

This effect is illustrated schematically in FIGS. 10A-10B, which illustrate the frequency resonance of a tip T during part of the indentation cycle illustrated in FIGS. 9A-9D. Oscillation preferably is modulated at a much higher frequency and lower amplitude during the unloading stage to explore the free space surrounding the tip. In TR mode, the tip T is preferably oscillated in the megahertz range during unloading and the kilohertz range during loading. In FIG. 9A, the tip T has not yet come into contact with the sample S, resulting in a free air peak $f_0$ of a maximum value and no contact peak $f_c$ as seen in FIG. 10A. Conversely, at the end of the loading phase of the indentation cycle in which the tip T is fully imbedded in the indent I as seen in FIG. 9B, the free air peak $f_0$ is a zero and the contact peak $f_c$ is at a maximum as seen in FIG. 10B. During the subsequent unloading phase of the indenting cycle, the contact peak $f_c$ of the unloading tip T will develop as soon as the apex A of tip has an angstrom-range room to oscillate, i.e., immediately after the apex A of the unloading tip leaves the bottom of the indent I. The detection of the resultant change in oscillation amplitude and/or frequency, coupled with a precise knowledge of probe position using the indenting feedback control technique discussed above, provides a very accurate determination the release point, $P_r$, or the bottom of the indent.

Figure 11A:
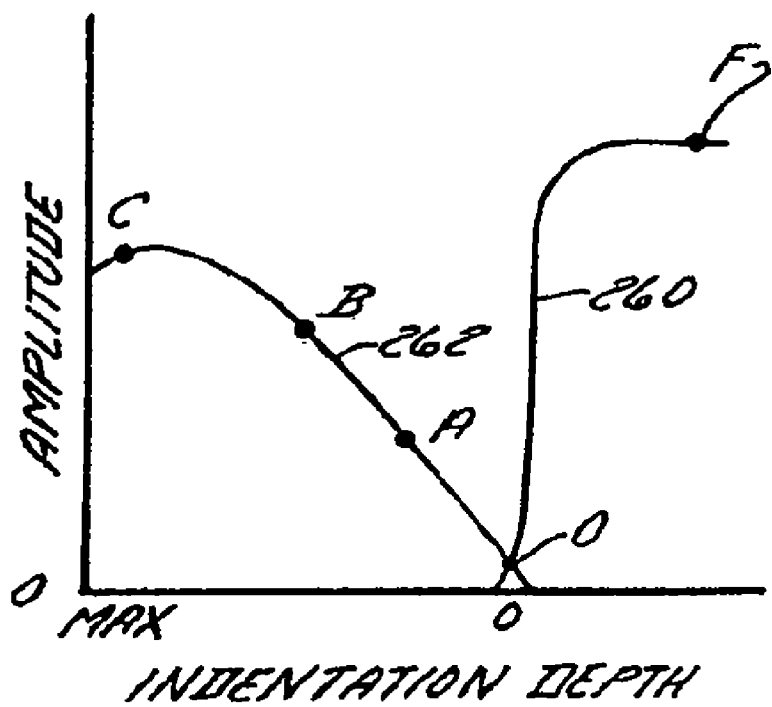
FIGS. 11A-11D are a series of graphs illustrating the full range of cantilever response during the loading phase of an indentation cycle.
Figure 11B:
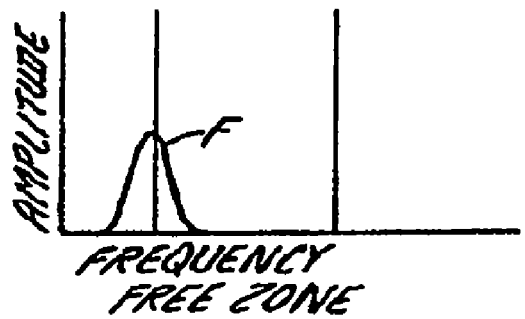
Figure 11C:
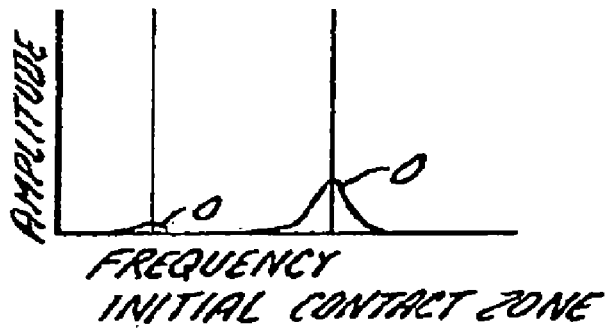
Figure 11D:
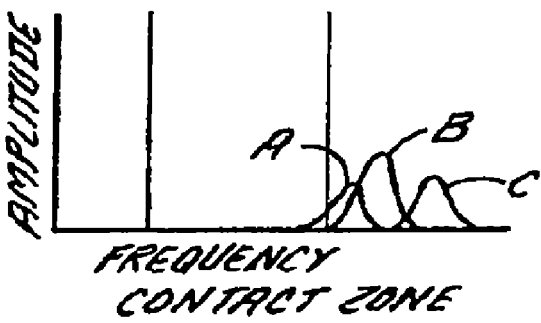

Contact resonance evolution as the tip moves towards and indents the sample during progressive zones of the loading phase of the indentation process is illustrated by FIGS. 11A-11D. In the initial or free zone of the loading phase in which the tip has not yet engaged the sample surface, the cantilever oscillates freely at a first frequency and a relatively high amplitude as can be seen at point F on the curve 260 of FIG. 11A and the curve F of FIG. 11B. When the tip engages the surface, the free resonance diminishes and the contact resonance starts to develop, as indicated by the point O at the intersections of curves 260 and 262 in FIG. 11A and the existence of both curves in FIG. 11C. As the loading phase proceeds (shown as A, B, C on curve 262 in FIG. 11A, with the resonance curve development shown in FIG. 11D) the amplitude of the contact resonance will continue to grow for a time and then diminish, while the resonance frequency shifts throughout the indentation phase due to the increase of the contact stiffness. A comparison of the contact resonance curve 262 at points O, A, B, and C to the point F on free resonance curve 260 in FIG. 11A shows that the contact resonance amplitude throughout the indentation phase is less than the free amplitude prior to probe/sample contact.

FIGS. 11A-11D only show one of the many contact modes developed during indentation contact depths change. Other modes includes, but are not limited to, torsional contact resonances of different modes, flexural contact resonances of different modes, and sub-resonance oscillation at different frequency.

Figure 9C:
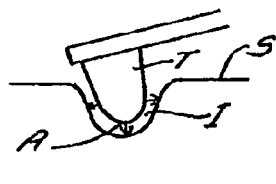
Figure 10C:
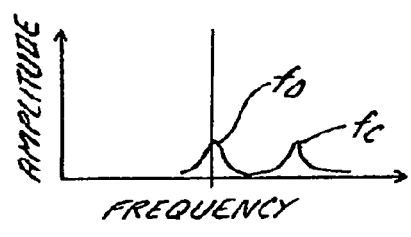
Figure 9D:
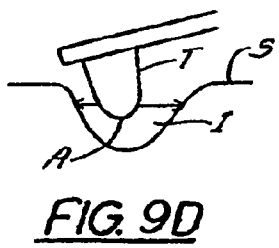
Figure 10D:
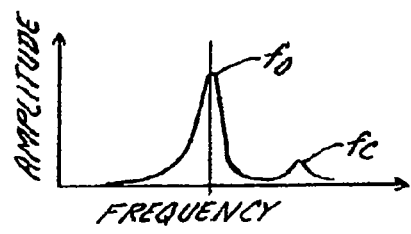

As the tip is withdrawn from the sample as seen in FIG. 9C, both contact resonance oscillation and free air resonance oscillation are detectable as seen in FIG. 10C, with the magnitude $f_0$ progressively decreasing and the magnitude of $f_c$ progressively increasing. Some $f_c$ components will remain so long as any portion of the oscillating tip contacts the sample. The contact peak $f_c$ will disappear only when no portion of the tip interacts with the sample, which occurs at the separation point $P_{sep}$ of the tip withdrawal process. The actual contact depth $h_{cact}$ can now be determined simply by subtracting $P_{sep}$ from $P_r$. Contact area $A_{con}$ can be determined from the actual contact depth $h_{cact}$ if the tip shape is known. Contact area determination therefore requires knowledge of the tip shape.

Three possible approaches to acquiring tip shape are well established and practiced either in commercial applications or scientific researches. A first approach is to directly characterize of tip using other imaging such as scanning electron microscopy. In this case the outline of the tip shape is mapped by a fine electron beam with the resolution of a few nanometers (see P. Grutter et al, APPLIED PHYSICS LETTERS 60 (22): 2741-2743 Jun. 1 1992, L. Montelius et al APPLIED PHYSICS LETTERS 62 (21): 2628-2630 May 24 1993, the subject matter of which is hereby incorporated by reference.)

A second approach is to indent the tip on a sample with perfect plastic deformation. In this case the plastic deformation of the indent provides a template of the tip shape. A sharper tip or other means of observation such as electron microscopy, AFM with a sharper tip are used to create surface image of the crater. The same indentation load/displacement curve on a perfectly plastically deformable sample can also be fitted by so called "area function" to give a best guess of the tip shape. Typically, a series of indents are applied to the reference material over a relatively large range of maximum loads and maximum penetration depths, hence permitting a measurement of the cross sectional area of the indenter tip as a function of the distance from the apex. This method has been used by Oliver and Pharr (see reference JOURNAL OF MATERIALS RESEARCH 7 (3): 613-617 MAR 1992, the subject matter of which is hereby incorporated by reference.)

A third approach uses blind reconstruction of tip topographic image through interacting tip with sharper features and using a morphological dilation method to reconstruct the tips shape (Su et al ULTRAMICROSCOPY 97 (1-4): 135-144 OCT-NOV 2003; Atamny et al SURFACE SCIENCE 323 (3): L314-L318 JAN 20 1995, the subject matter of which is hereby incorporated by reference.) The advantage of this approach is that the tip shape calibration can be performed in-situ by the AFM and the resolution can be better than the previous two methods. A disadvantage is that the interaction of the tip with sharp feature may be destructive, and great care need be taken in the imaging process, as discussed in the publication.

At the end of these processes, contact stiffness S can be determined from the detected peak pressure $P_{max}$ and the determined penetration depth $h_{max}$ as determined by subtracting $P_{ic}$ from $P_{max}$ using a variant equation (7) as derived above:

$$S = \frac{L_{max}}{p_{max} - p_{ic}} \quad (9)$$

The elastic modulus of the material $E_{sample}$ can then be determined using equation as derived above:

$$E_{sample} = (1-c)/((2\sqrt{A_{com}}/S\sqrt{\pi} - (1-c^2)/E_{tip})) \quad (8)$$

Creep, a quasistatic measurement, then can made by measuring plastic deformation for a number of force application rates and by correlating those measurements using constitutive equations shown in the reference of Nowick and Berry (Anelastic Relaxation in Crystalline Solids, the subject matter of which is hereby incorporated by reference.) Viscoelastic modulus can similarly be determined by measuring the sample's elastic modulus for a number of force application rates and by correlating those measurements using the same theory.

Figure 12:
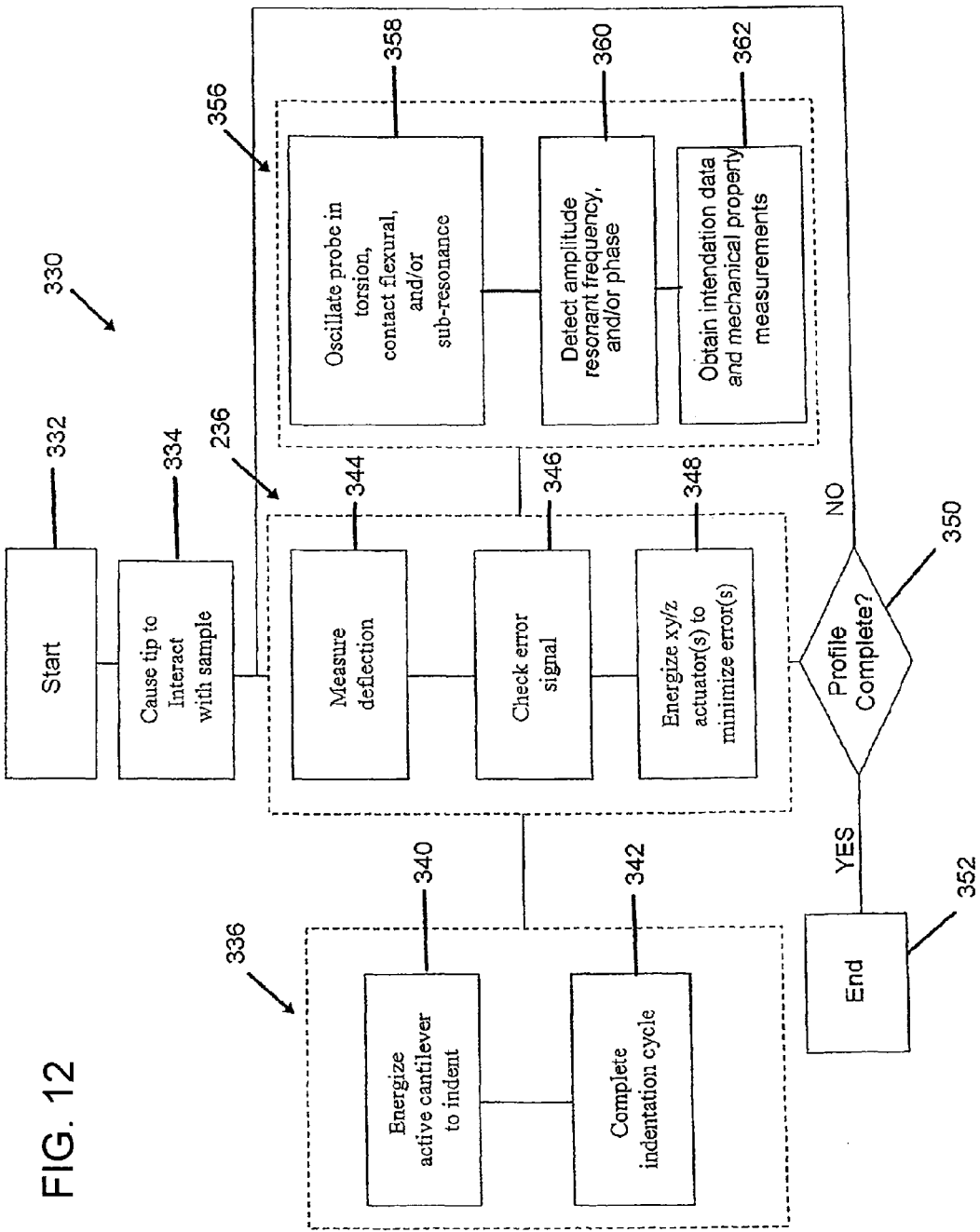
FIG. 12 is a flowchart for obtaining material property measurements in accordance with a preferred embodiment of the invention.
Figure 13A:
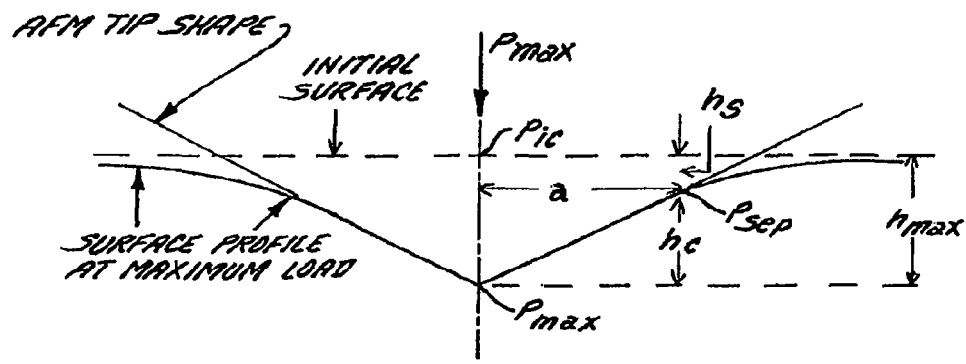
FIGS. 13A and 13B schematically illustrate the indentation of an elastic or visco-elastic sample using a probe tip.
Figure 13B:
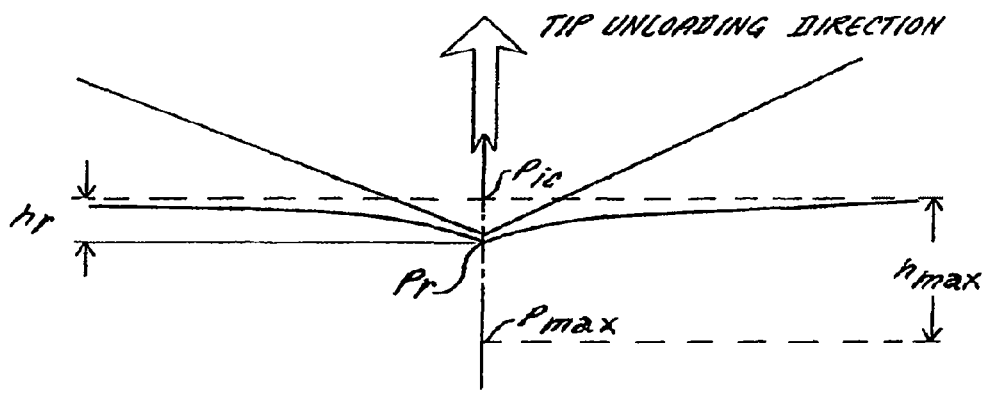
Figure 14A:
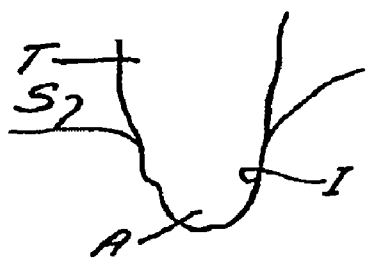
FIG. 14A schematically illustrates the indentation of a highly plastic sample with a tip.
Figure 14B:
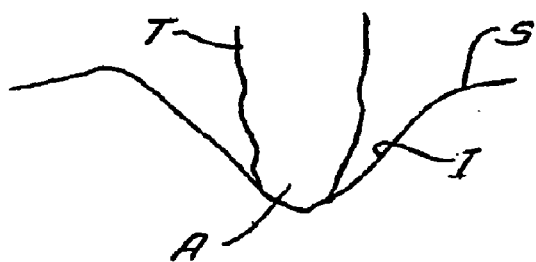
FIG. 14B schematically illustrates the indentation of a highly elastic sample with a tip.
Figure 15:
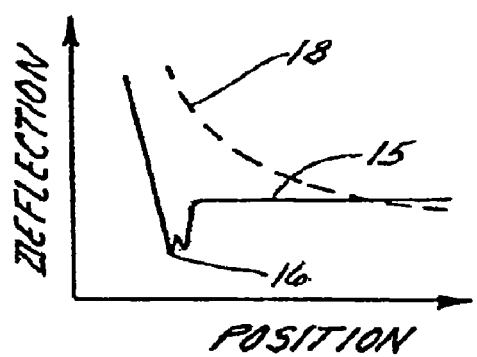
FIG. 15 is a graph illustrating AFM force curves for both hard and soft samples.

A generalized flowchart illustrating a process 330 for obtaining these measurements is illustrated in FIG. 12. Process 330 is identical to process 230 discussed above in connection with FIG. 7B but contains an additional data acquisition loop 356 for controlling the AFM 10 or 110 to obtain the data required for mechanical property measurements and to perform those measurements. Process 330 therefore proceeds from Start in Block 332 to cause the tip to interact with the sample in Block 334, whereupon an indentation control loop 336 and lateral force counteraction control loop 338 are performed simultaneously as discussed above in connection with FIG. 7B. Components of loops 336 and 338 are identical to the corresponding components of the loops 236 and 238 discussed above in connection with FIG. 7B and, accordingly, are denoted by the same reference numerals, incremented by 100.

The data acquisition loop 356 will now be discussed in more detail.

The data acquisition loop 356 begins in Block 358, where an xy position actuator and/or a z position actuator are controlled and the probe is driven to oscillate in the manner required to obtain data as discussed above, e.g., in connection with FIGS. 8-11B. Changes in probe oscillation amplitude, resonant frequency, and/or phase are detected in Block 360, also as discussed above, to obtain the data required for mechanical property measurements. This data may include, for example, $P_{ic}$, $P_r$, $P_{sep}$, and $P_{max}$. Then, in Block 362, mechanical property measurements such as plastic deformation, contact stiffness, and elastic modulus are made from the acquired data. Semistatic measurements such as creep and visco elastic modulus can be made after completion of a force profile in Block 350.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept. The scope of still other changes to the described embodiments that fall within the present invention but that are not specifically discussed above will become apparent from the appended claims and other attachments.

We claim:

1. A method comprising:
   indenting a sample with a probe of a probe-based instrument, the probe including a cantilever having a base and a free end, and the indenting occurring in an indentation cycle having a loading phase in which the probe is driven into the sample to form the indentation and an unloading phase in which the probe is withdrawn from the sample,
   during the indentation cycle, acquiring at least one datum required for obtaining a local mechanical property measurement; and
   using the acquired datum, obtaining the local mechanical property measurement.

2. The method of claim 1, wherein
   the probe is driven to oscillate during at least part of the indentation process,
   the acquiring step comprises detecting a change in at least one parameter of probe oscillation resulting from probe/sample interaction during the indentation cycle; and wherein
   the obtaining step comprises determining at least one of an initial contact point occurring when the probe first contacts the sample during the loading phase and a release point occurring when the probe releases from the sample during the unloading phase.

3. The method in claim 2, wherein the initial contact point is detected by detecting a change in one or more of 1) probe oscillation amplitude, 2) probe oscillation phase, and 3) probe oscillation resonant frequency occurring as a result initial probe/sample contact.

4. The method in claim 2, wherein the release point is detected by detecting a change in one or more of 1) probe oscillation amplitude 2) probe oscillation phase, and 3) probe oscillation resonant frequency occurring as a result of initial tip/sample separation.

5. The method in claim 2, where the datum is obtained by detecting a change in one or more of an oscillation amplitude an oscillation phase of sub-resonant oscillation of the cantilever.

6. The method in claim 2, where the datum is collected by detecting a change in one or more of an amplitude and a frequency of oscillation of a probe oscillating in torsional resonance.

7. The method of claim 1, wherein the mechanical property includes one or more of elastic modulus and visco-elasticity and is derived from a determined load/displacement relationship of the cantilever probe at a given contact area.

8. The method of claim 1, further comprising counteracting lateral forces imposed on the probe during the indentation cycle using a closed loop feedback process to maintain a characteristic parameter of the probe a constant.

9. The method of claim 8, wherein the probe includes an active cantilever, and wherein the counteracting step comprises energizing the active cantilever under feedback to impose a force impact on the probe that is of opposite sign to a lateral force on the probe induced by motion of the probe upon interacting with the sample.

10. The method of claim 1, further comprising:
(A) determining an initial contact point occurring when the probe first contacts the sample during the loading phase, and
(B) determining a release point occurring when the probe first separates from a bottom of the indentation during the unloading phase of the indentation cycle, the release point being determined by detecting a change in probe dynamic characteristics resulting from interaction between the probe and the indentation.

11. The method of claim 10, further comprising driving the probe to oscillate in torsional resonance; and wherein
the initial contact point is determined by noting the onset of a contact peak $f_c$ of probe resonant frequency that occurs when the probe first contacts the sample during the loading phase of the indentation cycle.

12. The method of claim 10, further comprising driving the probe to oscillate in torsional resonance; and wherein
the initial release point is determined by noting the onset of a contact peak $f_c$ of probe resonant frequency that occurs when the probe is withdrawn from the sample during the unloading phase of the indentation cycle.

13. The method of claim 12, further comprising determining a maximum penetration depth $P_{max}$, of probe penetration into the sample during the indentation cycle by monitoring the position of the probe at the juncture between the loading phase and unloading phase of the indentation cycle.

14. The method of claim 1, further comprising
driving the probe to oscillate in torsional resonance; and
determining an initial contact point by detecting a change in one or more of one of a torsional oscillation resonant frequency and a torsional oscillation amplitude occurring as a result of initial probe/sample contact during the loading phase.

* * * * *